United States Patent [19]

Yoshii

[11] B 4,014,043
[45] Mar. 22, 1977

[54] CASSETTE TYPE MAGNETIC RECORDING AND REPRODUCING APPARATUS

[75] Inventor: Tetsuji Yoshii, Neyagawa, Japan

[73] Assignee: Matsushita Electric Industrial Co., Ltd., Osaka, Japan

[22] Filed: May 15, 1974

[21] Appl. No.: 470,305

[44] Published under the second Trial Voluntary Protest Program on April 6, 1976 as document No. B 470,305.

Related U.S. Application Data

[62] Division of Ser. No. 71,592, Sept. 11, 1970, Pat. No. 3,872,509.

[30] Foreign Application Priority Data

| | | |
|---|---|---|
| Sept. 19, 1969 | Japan | 44-76031 |
| Oct. 2, 1969 | Japan | 44-78825 |
| Mar. 31, 1970 | Japan | 45-27573 |
| Apr. 17, 1970 | Japan | 45-37730[U] |
| Apr. 17, 1970 | Japan | 45-37731[U] |

[52] U.S. Cl. .................. 360/137; 360/96
[51] Int. Cl.$^2$ .................. G11B 27/14
[58] Field of Search .................. 360/96, 132, 137; 352/172; 235/103

[56] References Cited
UNITED STATES PATENTS

| | | | |
|---|---|---|---|
| 2,477,146 | 7/1949 | Scherbatskoy | 360/137 |
| 3,133,711 | 5/1964 | Jager | 235/103 |
| 3,152,332 | 10/1964 | Miyauchi | 352/172 |

*Primary Examiner*—James W. Moffitt
*Attorney, Agent, or Firm*—Stevens, Davis, Miller & Mosher

[57] ABSTRACT

A cassette type magnetic recording and reproducing apparatus provided with a means to indicate the amount of progress of the cassette tape. The indicating means is adapted to be reset to the zero position in association with the action of bringing a tape cassette for the recording or playback either into or out of its preset playback position.

1 Claim, 13 Drawing Figures

CASSETTE TYPE MAGNETIC RECORDING AND REPRODUCING APPARATUS

This is a division of application Ser. No. 71,592 filed Sept. 11, 1970, now U.S. Pat. No. 3,872,509.

This invention relates to a cassette type magnetic recording and reproducing apparatus.

The magnetic recording and reproducing apparatus is usually provided with an indicating means such as a tape counter and a tape indicator to indicate the position of the tape in progress.

Usually, such indicating means should be manually reset to the zero position every time a new tape is loaded for playback or recording. Otherwise, it becomes very troublesome to locate the intended record position in the tape. Sometimes, the complete rewinding of the tape should be undertaken in order to zero reset the indicating means after the complete rewinding of the tape, followed by the feeding of the tape to the intended position. Thus, negligence in the zero resetting operation causes extreme difficulties in locating the intended tape position. Of course, the merit of the tape counter or the tape indicator cannot be fully appreciated if the zero resetting is neglected.

An object of the present invention is to provide a cassette type magnetic recording and reproducing apparatus, wherein the indicating means for indicating the tape feed amount is adapted to be reset to the zero position in association with the action of bringing the tape cassette either into or out of its preset playback position.

According to the invention the tape progress indicating means may be kept reset to the zero position so long as the tape is not loaded in the apparatus and may be rendered operative in association with the operation of loading the tape, thus enabling the start of the progressive indication with the starting of the tape drive. Thus, if the tape drive is started without loading the tape, the tape progress indicating means, unlike the prior-art indicating means, will not be started with the rotation of the reel base. This makes unnecessary the troublesome job of manually zero resetting the indicating means every time a new tape is started. By loading and starting the tape the indicating means will start the progressive indication of the tape feed amount from its zero position. Also, the possibility of neglecting the zero resetting of the indicating means is eliminated. The invention thus features excellent effects of simplifying the handling of tape recorders.

The invention will now be described in conjunction with some preferred embodiments thereof with reference to the accompanying drawings, in which.

Figure 1:
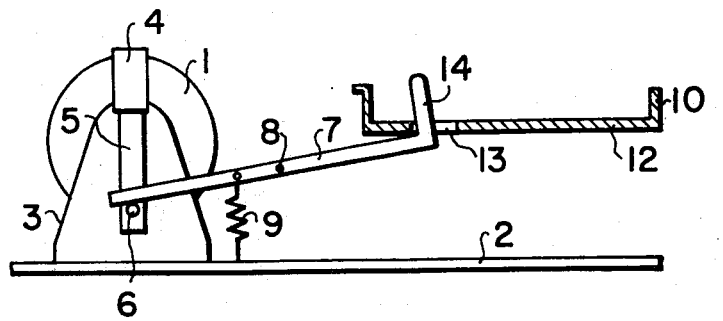
FIG. 1 is a fragmentary schematic sectional view showing an embodiment of the invention as applied to a tape recorder.
Figure 2:
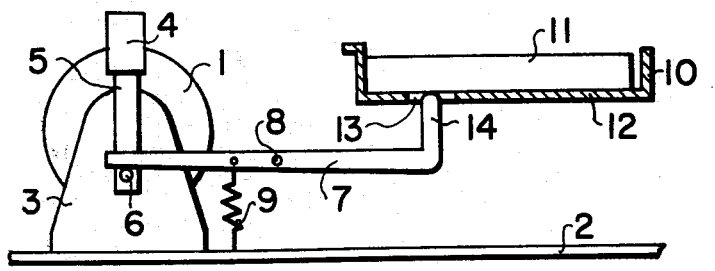
FIG. 2 is a view similar to FIG. 1 showing the tape cassette in its operative position.

FIGS 1 and 2 show a first embodiment of the invention as applied to a tape recorder. Reference numeral 1 designates a counting wheel assembly of a tape counter. It is carried by a support frame 3 secured to a base plate 2. Numeral 4 designates a zero resetting button for manually resetting the counting wheel assembly 1 to the zero position. By depressing the button 4 a button lever 5 is lowered, thereby resetting the counting wheel assembly to the zero position.

The button lever 5 is provided with a pin 6, which is extended under a tape loading detection lever 7 and in contact therewith adjacent one end thereof. The detection lever 7 is rotatably supported at its center on a pin 8 and urged by a spring 9 in the counterclockwise direction. The button lever 5 is normally held at its lower position, as the pin 6 is urged downwardly, so that the counting wheel assembly 1 is kept reset in its zero position.

Numeral 10 designates a cassette loading section, in which a tape cassette 11 may be loaded. Its bottom plate 12 is formed with an opening 13, through which a bent end portion 14 of the detection lever 7 remote from the pin 6 extends into the cassette loading section 10.

With the construction described above, so long as the tape cassette 11 is not loaded as shown in FIG. 1, the detection lever 7 is downwardly urging the button lever 5 and holding the latter in the lower position thereof, and the counting wheel assembly 1 of the tape counter will remain reset even if the tape drive means is operated. When the tape cassette 11 is loaded in the cassette loading section 10 as shown in FIG. 2, the underside of the tape cassette 11 pushes down the end portion 14 of the detection lever 7 to rotate the detection lever 7 against the spring force of the spring 9 in the clockwise direction so as to upwardly return the button lever 5, thereby allowing the indication of the amount of the tape feed by the tape counter. In this state, the amount of the tape fed as the tape is driven is progressively indicated.

When the tape cassette 11 is removed from the cassette loading section 10, the detection lever 7 is rerotated in the counterclockwise direction by the spring 9 to lower the button lever 7, thus resetting the counting wheel assembly 1 to the zero position and recovering the initial state as shown in FIG. 1.

Although the above description is concerned with a cassette type tape recorder, this is by no means limitative. The invention is applicable to tape recorders of other types such as a magazine type, cartridge type or open reel type tape recorder. Also, the tape counter may be replaced with other means of indicating the amount of the tape feed. Further, the detection lever 7 may be adapted to actuate a switch means for operating the tape counter by such means as an electromagnet.

Furthermore, it is possible to utilize the restoring force of the spring 9 urging the detection lever 7 as the unloading force involved at the time of removal of the cassette. To this end, the cassette, when it is loaded, may be, for example, held in a predetermined position by a cassette holding means (not shown), so that the cassette may be automatically pushed up and unloaded by removing the afore-said cassette holding means, while simultaneously causing the zero resetting of the tape feed amount indicating means.

Figure 3:
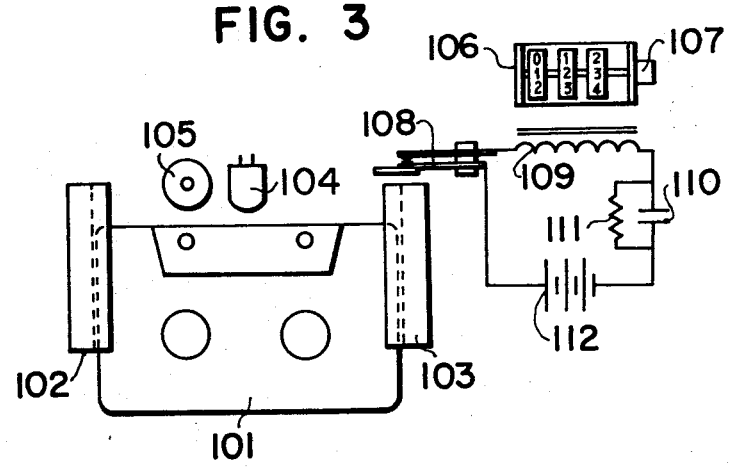
FIGS. 3 and 4 show another embodiment of the invention for electrically causing the zero resetting of a tape counter in a tape recorder.
Figure 4:
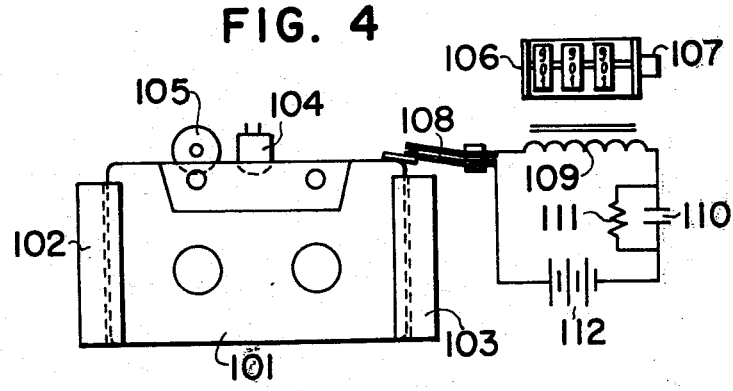
Figure 5:
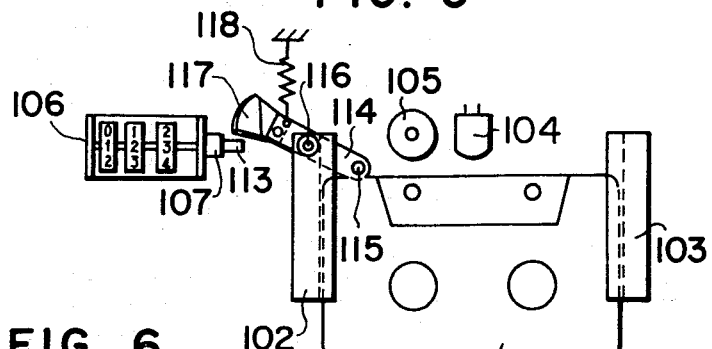
FIGS. 5 to 8 show a further embodiment of the invention for mechanically causing the zero resetting of the tape counter.
Figure 6:
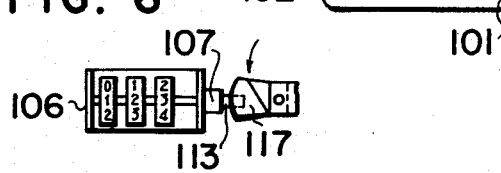
Figure 7:
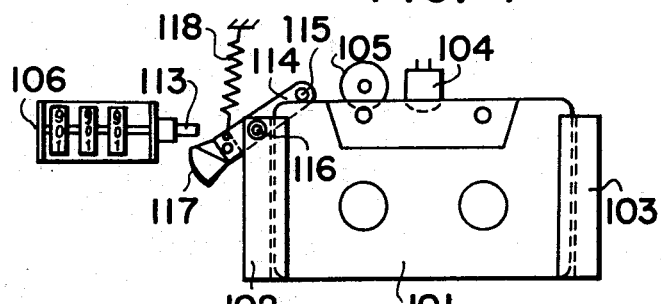
Figure 8:
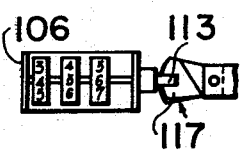

FIGS. 3 and 4 show a second embodiment of the invention. Referring to the Figures, reference numeral 101 designates a tape cassette, numerals 102 and 103 guide members to guide the tape cassette 101 as the cassette is inserted to be placed in the playback position, numeral 104 a magnetic head, and numeral 105 a pinch roller. Numeral 106 designates a tape counter provided with a zero resetting button 107. Numeral 108 designates a switch adapted to detect the loading of the tape cassette 101 in the predetermined playback position. It is connected through an electromagnet 109 for zero resetting the tape counter 106 and a parallel circuit of a capacitor 110 and a resistor 111 across a power supply 112 driving the electromagnet 109. The parallel circuit has an appropriate time constant for the discharging of the capacitor 110 caused upon the opening of the switch 108.

In operation, when the tape cassette 101 is brought from its position shown in FIG. 3 to its predetermined playback or recording position shown in FIG. 4, the switch 108 is closed upon detection of the insertion of the tape cassette 101, rendering the electromagnet 109 operative. The electromagnet is held operative for a short period of time until the capacitor 110 is completely charged, thereby effecting the zero resetting of the tape counter 106. Thus, the tape counter 106 is now ready for the progressive indication of the amount of the tape feed in the subsequent recording or playback.

In the preceding embodiment the zero resetting is achieved electrically. Alternately, it may be achieved through a mechanical means. FIGS. 5 to 8 show a further embodiment, in which the zero resetting is mechanically effected. In this embodiment, as the tape cassette 101 being inserted along the guide members 102 and 103 approaches its final operative position, it rotates a zero resetting lever 114 about a support pin 116 in the counterclockwise direction against the force of a spring 118. By the rotation of the zero resetting lever 114 in the counterclockwise direction, a slanted face of a plate spring 117, which is on the zero resetting lever 114 at the free end thereof, downwardly pushes a zero resetting pin 113 integral with the zero resetting button 107 of the tape counter 106. (see FIG. 6), causing the zero resetting of the tape counter 106. The downwardly urging engagement of the plate spring 117 with the zero resetting pin 113 is released before the zero resetting lever 114 is brought to its final position (see FIG. 7). When this state is brought about, the amount of the tape fed subsequently may be correctly indicated by the tape counter 106.

The zero resetting lever 114 is provided at its end remote from the plate spring 117 with a pin 115, with which the front edge of the tape cassette 101 is brought into engagement as the cassette is loaded. When the tape cassette 101 is unloaded from its operative position shown in FIG. 7, the zero resetting lever 114 is rotated by the restoring force of the spring 118 in the clockwise direction (see FIG. 8), and is returned to its initial position before the unloading of the tape cassette 101. At this time, the plate spring 117 having the slanted face clears the underside of the zero resetting pin 113 without affecting the tape feed amount indication by the tape counter 106. In other words, it is returned to its initial position without causing the zero resetting of the tape counter 106 (see FIG. 5).

Figure 9:
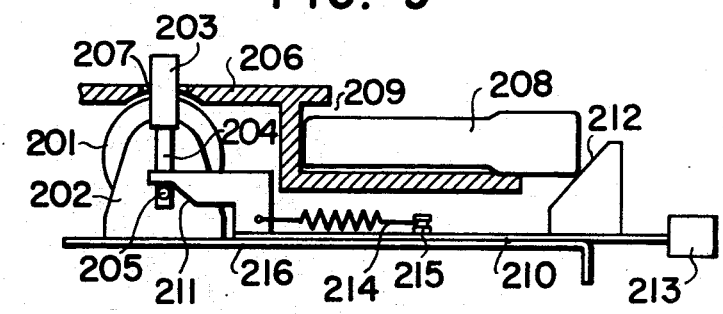
FIGS. 9 and 10 show a still further embodiment of the invention.
Figure 10:
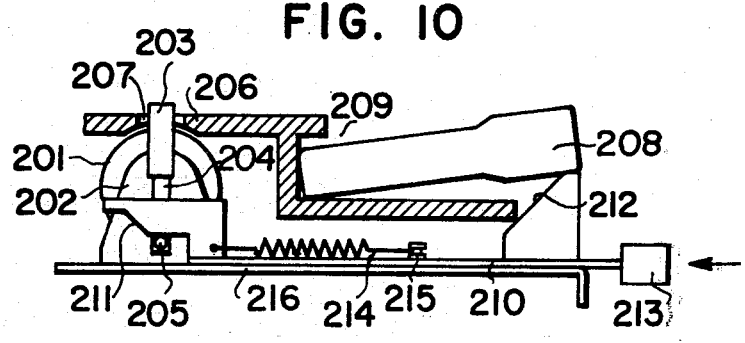

FIGS. 9 and 10 show a still further embodiment of the invention. In the Figures, reference numeral 201 designates a counting wheel assembly of a tape counter. It is carried by a support frame 202 of the tape counter. Numeral 203 designates a zero resetting button, which may, if necessary, be manipulated to cause the zero resetting. Extending from the zero resetting button 203 is a zero resetting button rod 204 provided with a pin 205. Numeral 206 designates an upper plate of a casing of a tape recorder. It is formed with a display aperture or window 207 for the display of the indication of the counting wheel assembly 201. Numeral 208 designates a tape cassette loaded in a cassette loading section 209, below which extends a cassette pop-up rod 210 provided at one end thereof with a slant cam member 211 and at the other end thereof with a cassette pop-up button 213. By depressing the cassette pop-up button 213 the pin 205 is adapted to be engaged and lowered by the slant cam member 211 to lower the zero resetting rod 204, thereby causing the zero resetting of the counter wheel assembly 201 of the tape counter. The cassette pop-up rod 210 is also provided with a cassette pop-up member having a slant edge 212. The slant edge 212 is adapted to be caused to pop up the tape cassette 208 by the manipulation of the cassette pop-up button 213, as shown in FIG. 10. The pop-up rod 210 is urged to its initial position by a spring 214 having one end thereof attached to the slant cam member 211 and the other end thereof attached to an attachment member 215 secured to a base plate 216.

With the construction described above, in the operative state for playback or recording with the tape cassette 208 loaded in the cassette loading section 209 as shown in FIG. 9, the cassette pop-up button 213 may be depressed to move the pop-up rod 210 against the spring force of the spring 214 in the direction of the arrow, thereby causing the tape cassette 208 to be popped up by the slant edge 212 of the pop-up member while at the same time forcing the slant cam member 211 to lower the pin 205. By the lowering of the pin 205 the zero resetting rod 204 is lowered to cause the zero resetting of the tape counter. Accordingly, the tape counter is always reset to the zero position after the unloading of the tape cassette, so that it may be operated from the zero position for the next recording or playback using a new tape cassette. In this embodiment, both the hoppingup of the tape cassette and the zero resetting of the tape counter are effected by a single integral means consisting of the pop-up rod 210. In practice, however, the same end may be achieved by a plurality of mutually cooperating means. Also, the tape counter may be replaced with a tape indicator or other indicating means.

Figure 11:
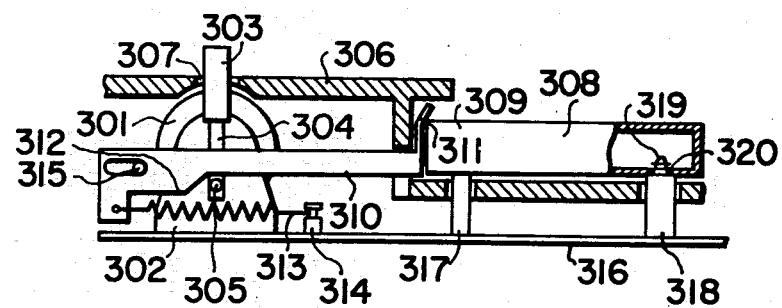
FIG. 11 shows a further embodiment of the invention.

FIG. 11 shows a further embodiment of the invention. Reference numeral 301 designates a counter wheel assembly of a tape counter. It is carried by a support frame 302. Numeral 303 designates a zero resetting button for manually zero resetting the tape counter. Extending from the zero resetting button 303 is a zero resetting button rod 304 provided with a pin 305. Numeral 306 designates an upper plate of a casing of a tape recorder. It is formed with a display aperture or window 307 for the display of the indication of the tape counter. Numeral 308 designates a tape cassette, which is shown to be loaded in a cassette loading section 309. Numeral 310 designates a detecting member to detect the loading of the cassette. It also serves to push back the loaded cassette to hold the loaded cassette in the predetermined operative position. The loaded cassette 308 is correctly positioned both depthwise and heightwise, as it is urged by a slanted portion 311 of the detecting member 310. The detecting member 310 is stepped at a slant cam portion 312, so that when it is moved leftwardly as the cassette 308 is loaded the pin 305 provided on the zero resetting button rod 304 of the tape counter is releaved of the downwardly urging force, thus enabling the indication of the tape position in accordance with the travel of the loaded tape. Numeral 315 designates a guide pin to guide the detecting member 310. The detecting member 310 is urged to its initial position by a spring 313, which also serves to exert backward force to the loaded cassette and has its one end attached to the detecting member 310 and its other end attached to an attachment member 314 secured to a base plate 316. Extending from the base plate 316 is a positioning pin 317 to determine the level of the rear edge of the loaded cassette 308. Also extending from the base plate 316 is another positioning pin 318 to determine both the level of the front edge of the loaded cassette 308 and the deptwise position thereof. It is provided with a guide pin head 319 extending from its upper end and adapted to be inserted through a guide opening 320 of the cassette 308. The guide head 319 has its top portion of an increased diameter like an abacus bead, so that the cassette 308 once loaded will be hooked by it and prevented from easily becoming detached upwardly off it owing to the urging force exerted by the detecting member 310.

With the construction described above, when the cassette 308 is unloaded, the detecting member 310 is moved rightwardly by the spring force of the spring 313, so that its slant cam portion 312 pushes down the pine 305 to lower the zero resetting button rod 304, thus causing the zero resetting of the tape counter. When a new tape cassette is loaded, the detecting member 310 is moved leftwardly against the spring force of the spring 313 to return the zero resetting button rod 304 with the pin 305, so that the indication of the tape feed amount may be started from the zero position of the tape counter.

In this embodiment, as the detecting member 310 is adapted to urge the rear edge of the loaded cassette 308, the cassette 308 may be held in its operative position without requiring a separate urging means. As is seen, according to the invention the possibility of neglecting the zero resetting of the tape counter at the time of replacement of the tape may be eliminated and the indication of the tape feed amount of the substituted tape may always be started with the zero position of the tape counter. Accordingly, the tape counter may be effectively utilized.

Also, the zero resetting of the tape counter may be manually brought about in the mid course of the tape feed, if desired, by depressing the zero resetting button 303. Further, though in the above embodiment both the detection of the loading and unloading of the cassette and the zero resetting of the tape counter are effected by a single integral means, such means may be replaced, if necessary, with a combination of co-operating separate members. Furthermore, the tape counter may be replaced with a tape indicator.

Figure 12:
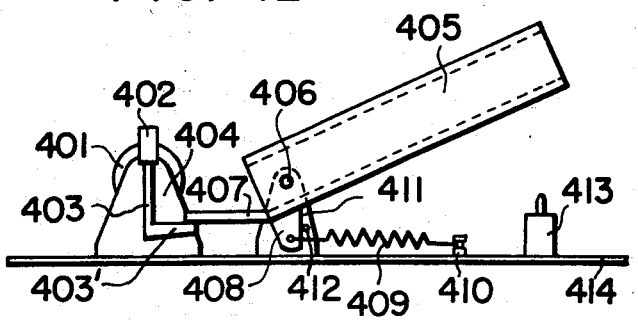
FIGS. 12 and 13 show a still further embodiment of the invention.
Figure 13:
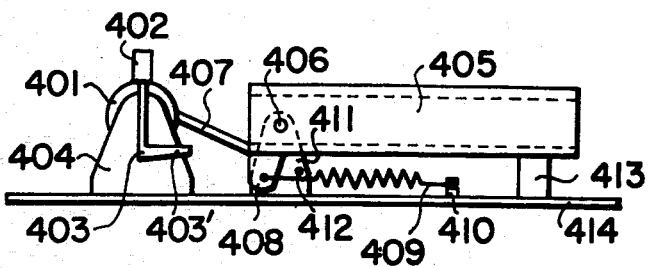

FIGS. 12 and 13 show a further embodiment of the invention. Reference numeral 401 designates a counter wheel assembly of a tape counter. It is carried by a support frame 404 of the tape counter. Numeral 402 designates a zero resetting button for manually resetting the tape counter to the zero position. By depressing the button 402 the transmission of the driving power to the tape counter is cut as well as causing the zero resetting of the tape counter. Extending integrally from the zero resetting button 402 is a zero resetting button rod 403. Numeral 405 designates a cassette holder, into which a tape cassette is inserted in the state as shown in FIG. 12, and which is then rotated about a pin 406 mounted in a pin support 411 to bring the tape cassette to an operative position for recording or playback as shown in FIG. 13. The cassette holder 405 is provided with an actuating member 13 integral therewtth. By popping up the cassette to its position shown in FIG. 12 the actuating member 407 strikes and lowers a horizontal extension 403' of the zero resetting button rod 403 of the tape counter to reset the tape counter to the zero position. The cassette holder 405 is urged by a spring 409 having its one end attached to an attachment member 408 integral with the cassette holder 405 and its other end attached to another attachment member 410 secured to a base plate 414. Numeral 412 designates a stop pin to restrict the rotation of the cassette holder 405 when the holder is popped up. Numeral 413 designates a positioning pin to determine the level of the cassette holder 405 when the holder is placed in its playback set position. Although the actuating member 407 is made integral with the cassette holder 405, a separate means to cause the zero resetting of the tape counter in association with the movement of the cassette holder 405 may be provided depending upon the disposition of the cassette holder 405 relative to the tape counter.

With the construction described above, when the cassette holder is popped up to unload the cassette, the tape counter is automatically reset to the zero position. Accordingly, for the subsequent playback, which may be started after loading a new tape cassette in the cassette holder 405 and placing the holder in its preset playback position, the tape counter is ready for the indication of the feed amount of the tape in accordance with the progress of the tape from the zero position of the tape counter.

Although in the foregoing embodiments of the invention the zero resetting is accomplished at the time of loading the tape, the same effects may be obtained by arranging such that the zero resetting is brought about at the time of unloading the tape. Also, when the invention is applied to a cassette auto-changer type recording and reproducing apparatus where a plurality of tape cassettes are successively loaded for the successive recording or playback, the tape counter may be repeatedly reset to the zero position every time a new tape cassette is substituted, so that the indication of the tape feed amount corresponding to the progress of the tape in each tape cassette may always be obtained.

Also, though a digital tape counter is used in the foregoing embodiments, this is by no means limitative, but other tape indicating means of the analog type may be used as well.

What is claimed is:
1. A cassette type magnetic recording and reproducing machine in which a tape is housed in a cassette, comprising:
 a. a cassette support;
 b. means for indicating the amount of feed of the tape in the cassette; and
 c. means, interposed between the cassette support and the indicating means, for automatically zero resetting the indicating means directly in response to movement of the cassette into the playing position of the tape, including, in electrical circuit, a power source, a switch which is closed on movement of the cassette into the playing position of the tape, an electromagnet which resets said indicating means, and a resistor and capacitor having a predetermined relatively short time constant, said electromagnet being operative for a relatively short time until said capacitor is charged.

* * * * *